Figure 1:
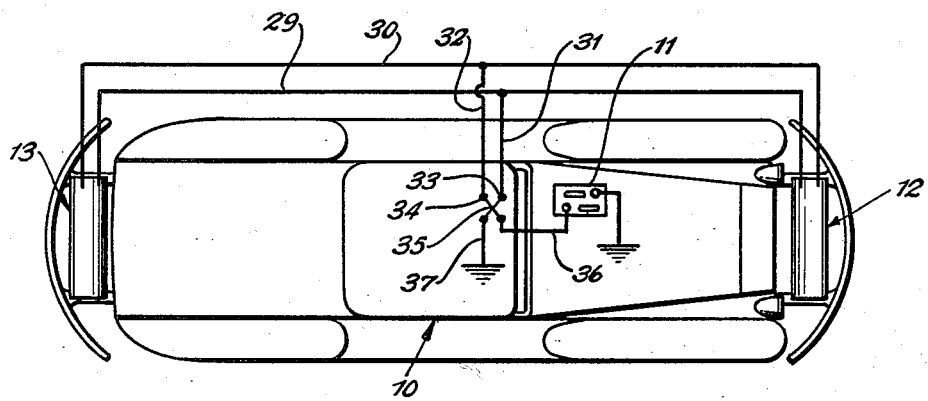

Nov. 16, 1948.  C. H. PHILLIPS  2,453,931
ELECTRIC VEHICLE DIRECTION INDICATOR

Filed Feb. 13, 1946  2 Sheets-Sheet 1

Inventor
Clovis H. Phillips.

By Clarence A. O'Brien
and Harvey B. Jacobson
Attorneys

Nov. 16, 1948.  C. H. PHILLIPS  2,453,931
ELECTRIC VEHICLE DIRECTION INDICATOR
Filed Feb. 13, 1946  2 Sheets-Sheet 2
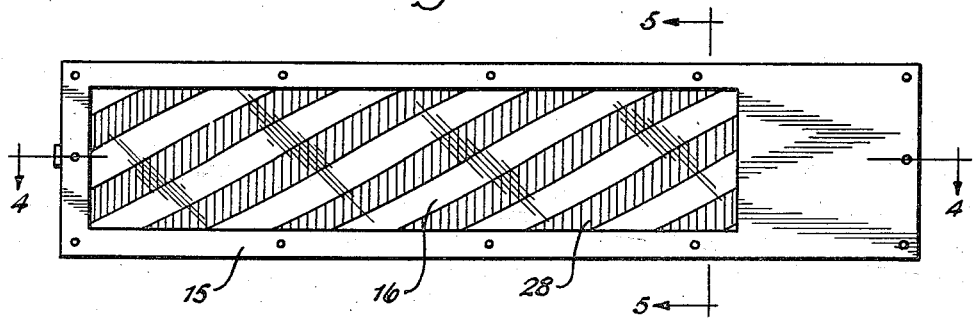
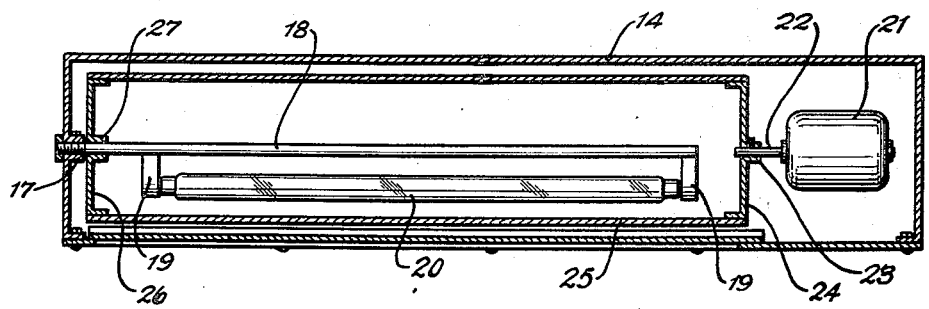
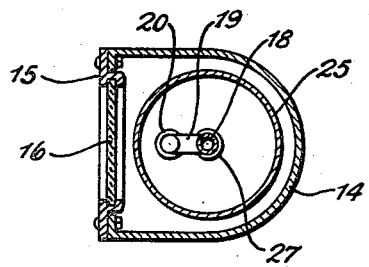
Inventor
Clovis H. Phillips.
By Clarence A. O'Brien
and Harvey B. Jacobson
Attorneys Patented Nov. 16, 1948

2,453,931

UNITED STATES PATENT OFFICE 2,453,931

ELECTRIC VEHICLE DIRECTION INDICATOR

Clovis H. Phillips, Florence, Ala.

Application February 13, 1946, Serial No. 647,267

2 Claims. (Cl. 177—329)

1

This invention relates to a direction indicator and more particularly to a device for signaling the intention of a motorist to turn either to the right or to the left.

The primary object of the invention is to warn those approaching the vehicle of the intention of the driver thereof and give them an opportunity to so govern themselves as to avoid collision therewith.

Another object of the invention is to enable the warning signal to be seen from either the forward or rear end of the vehicle.

The above and other objects may be attained by employing this invention which embodies among its features a drum mounted to rotate about a horizontal axis at or near each end of a vehicle, each drum carrying a spiral band which contrasts in color with the color of the drum, and means for rotating the drums in unison in one or the other direction to give a visual indication to a person or persons approaching the vehicle of the intent of the driver to turn either to the right or to the left.

Other features include a reversible motor having driving connection with each drum, means to supply electric energy to the motors from the electrical system of the vehicle upon which the drums are mounted and a reversing switch in the circuit with the motors for causing them to rotate in unison.

Figure 2:
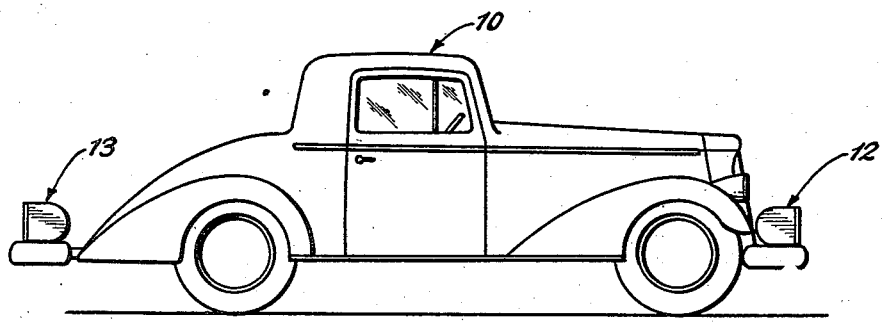

In the drawings,

Figure 1 is a top plan view of a motor vehicle showing the same equipped with my improved signaling devices, and illustrating diagrammatically the manner in which the signaling devices are connected to the electrical system of the vehicle, Figure 2 is a side view of Figure 1, Figure 3 is an enlarged front view of one of the signaling devices, Figure 4 is a longitudinal sectional view taken substantially along the line 4—4 of Figure 3, and Figure 5 is a transverse sectional view taken substantially along the line 5—5 of Figure 3.

Referring to the drawings in detail a motor vehicle designated generally 10 is equipped with the customary electrical system, the main power source of which is a conventional accumulator or storage battery 11. Mounted at the forward end of the vehicle is a signal designated generally 12 and a signal 13 of identical construction is mounted at the rear end of the vehicle as will be readily understood upon reference to Figures 1 and 2. Each of the signals 12 and 13 comprises a horizontally disposed housing 14 having an open

2 front face which is closed by a removable frame 15 carrying a transparent window 16. Formed on one end wall of the housing 14 is a hollow boss 17 into which one end of a supporting shaft 18 is received, and extending radially from the supporting shaft 18 towards the window 16 are spaced terminal sockets 19 for the reception of opposite ends of a tubular lamp 20.

Mounted in the end of the casing 14 opposite the wall carrying the tubular socket 17 is a reversible motor 21 to the drive shaft 22 of which is fixed a hub 23 carrying a disc or spider 24 which serves to support one end of a rotatable drum 25. The opposite end of this drum is secured to a disc or spider 26 having a hub 27 which is rotatably supported on the shaft 18 near the boss 17. It is to be understood that the shaft 18 is preferably tubular in form to accommodate conductors which lead to the contacts in the socket 19 in order to convey electrical current to the opposite ends of the tubular lamp 20 in order to energize the same. The drum 25 carries on its outer face one or more spiral bands 28 of a color which contrasts with the color of the drum so that as the drum is put into operation the band 28 will produce in the eyes of an observer the sensation of motion in one direction. Obviously if the drum is rotated in an opposite direction the spiral bands 28 will produce in the eyes of the observer the idea of motion in the opposite direction. The drum 25 is preferably formed from a translucent material to permit the light from the lamp 20 to illuminate it.

Connected to one terminal of each motor 21 is a conductor 29, and connected to the opposite terminal of each motor is a conductor 30. These conductors are connected intermediate their ends to lead wires 31 and 32 respectively which in turn are connected to the terminals 33 and 34 respectively of a reversing switch 35. One pole of the reversing switch is connected to the battery 11 through the medium of a conductor 36 whereas the opposite pole is connected through a conductor 37 to ground. Inasmuch as one terminal of the battery 11 is also grounded it will be obvious that when the switch is moved to connect the terminal to which the conductor 36 is connected with the contact 34, the motors 21 will be energized and caused to rotate in one direction whereas when the switch 35 is changed, the motors 21 will be driven in a reverse direction. It is preferred that the reversing switch 35 be situated within easy reach of the driver of the vehicle so that the signals may be conveniently operated to signal to an observer the intent of the driver. It is also contemplated that the switch may be so constructed and arranged as automatically to be operated upon the turning of the steering wheel of the vehicle.

In operation it will be understood that when the driver is about to make a turn he manipulates the switch 35 to set the motors 21 into operation so as to drive the drums 25 in the housings 14 at the opposite ends of the vehicle. The direction of rotation of the motors will cause the drums to rotate in a like direction and hence due to the optical effects of the spiral bands 28 on the eyes of an observer, a definite impression as to the direction in which the vehicle is about to turn will be created.

While in the foregoing there has been shown and described the preferred embodiment of this invention it is to be understood that minor changes in the details of construction, combination and arrangement of parts may be resorted to without departing from the spirit and scope of the invention as claimed.

Having thus described the invention, what I claim as new is:

1. A direction indicator comprising an elongated horizontally disposed housing adapted to be mounted on one end of a motor driven vehicle having an electrical system, said housing having an elongated longitudinally extending window in its front side, a rod fixed at one end to one end of the housing, said rod lying along the longitudinal axis of the housing, a drum of translucent material encircling said rod and rotatably supported at one end on the rod adjacent the end of the housing to which the rod is fixed, a reversible motor in the housing adjacent its opposite end, the drive shaft of the motor aligning axially with the rod and supporting the end of the drum remote from that carried by the rod, spiral stripes of contrasting color on the drum, said stripes being visible through the window and a reversing switch coupling the motor to the electrical system of the vehicle selectively to control the direction of rotation of the drum.

2. A direction indicator comprising an elongated horizontally disposed housing adapted to be mounted on one end of a motor driven vehicle having an electrical system, said housing having an elongated longitudinally extending window in its front side, a rod fixed at one end to one end of the housing, said rod lying along the longitudinal axis of the housing, a drum of translucent material encircling said rod and rotatably supported at one end on the rod adjacent the end of the housing to which the rod is fixed, a reversible motor in the housing adjacent its opposite end, the drive shaft of the motor aligning axially with the rod and supporting the end of the drum remote from that carried by the rod, spiral stripes of contrasting color on the drum, said stripes being visible through the window, a reversing switch coupling the motor to the electrical system of the vehicle selectively to control the direction of rotation of the drum, and an elongated tubular lamp supported on the rod within the drum for illuminating the drum.

CLOVIS H. PHILLIPS.

REFERENCES CITED

The following references are of record in the file of this patent:

UNITED STATES PATENTS

| Number | Name | Date |
| --- | --- | --- |
| 413,577 | Smith | Oct. 22, 1889 |
| 1,407,471 | Mayer | Feb. 21, 1922 |
| 1,492,089 | Squier | Apr. 29, 1924 |
| 1,831,814 | Livingston | Nov. 17, 1931 |
| 1,987,459 | Anchors | Jan. 8, 1935 |
| 2,138,976 | Mason | Dec. 6, 1938 |